United States Patent
Jakobuss et al.

(10) Patent No.: US 7,637,257 B2
(45) Date of Patent: Dec. 29, 2009

(54) SYSTEM AND METHOD FOR CUTTING GRANITE OR SIMILAR MATERIALS

(75) Inventors: Markus Jakobuss, Westerville, OH (US); Dennis W. Turner, Gahanna, OH (US); Stephen Hayden, Sunbury, OH (US); Andre Kuehn, Rossdorf (DE); Kurt Proske, Dreiech-Dreieichenhain (DE)

(73) Assignee: Diamond Innovations, Inc., Worthington, OH (US)

( * ) Notice: Subject to any disclaimer, the term of this patent is extended or adjusted under 35 U.S.C. 154(b) by 85 days.

(21) Appl. No.: 10/568,105

(22) PCT Filed: Aug. 13, 2004

(86) PCT No.: PCT/US2004/026316

§ 371 (c)(1),
(2), (4) Date: Oct. 30, 2006

(87) PCT Pub. No.: WO2005/016610

PCT Pub. Date: Feb. 24, 2005

(65) Prior Publication Data

US 2007/0042685 A1    Feb. 22, 2007

Related U.S. Application Data

(60) Provisional application No. 60/495,148, filed on Aug. 14, 2003.

(51) Int. Cl.
*B28D 1/04* (2006.01)
(52) U.S. Cl. .......................... 125/13.01; 125/17; 125/18
(58) Field of Classification Search .............. 125/13.01, 125/17, 18
See application file for complete search history.

(56) References Cited

U.S. PATENT DOCUMENTS

| 3,263,669 | A | * | 8/1966 | Ashley .................. 125/16.01 |
| 3,662,734 | A | | 5/1972 | Sisler |
| 4,287,869 | A | * | 9/1981 | Schmid .................. 125/16.01 |
| 4,559,920 | A | * | 12/1985 | Toncelli et al. ............... 125/17 |
| 4,566,427 | A | | 1/1986 | Marechal et al. |
| 5,233,965 | A | | 8/1993 | Ishikawa et al. |
| 5,233,968 | A | | 8/1993 | Vannucci |

(Continued)

FOREIGN PATENT DOCUMENTS

EP     0879683     11/1998

*Primary Examiner*—Joseph J Hail, III
*Assistant Examiner*—Shantese L McDonald
(74) *Attorney, Agent, or Firm*—Maria C. Gasaway

(57) ABSTRACT

An improved frame saw system has multiple blades for cutting slabs of masonry materials. The improved systems and methods allow for cutting masonry materials into slabs having surface small deviations. A frame saw system may include a support structure of unifying material bonded to at least one of the blades for keeping the blades in fixed relative positions. The support structure may be removable from the frame saw system as the blades are engaged in a swinging motion cutting into the block. In addition, a process for cutting masonry blocks of granite, marble, rock, and the like, includes pre-treating the surface of the block with a skim coat to fill surface irregularities prior to cutting operations. A frame saw system may contain one or more spacers between the saw blades wherein a compressive force is applied across the blades connected to a frame to reduce deflection of the blades while cutting.

12 Claims, 5 Drawing Sheets

U.S. PATENT DOCUMENTS 6,098,609 A    8/2000  Ishizuka
7,089,925 B1 * 8/2006  Lin et al. ...................... 125/21
2003/0127086 A1  7/2003  Brauninger et al.

* cited by examiner

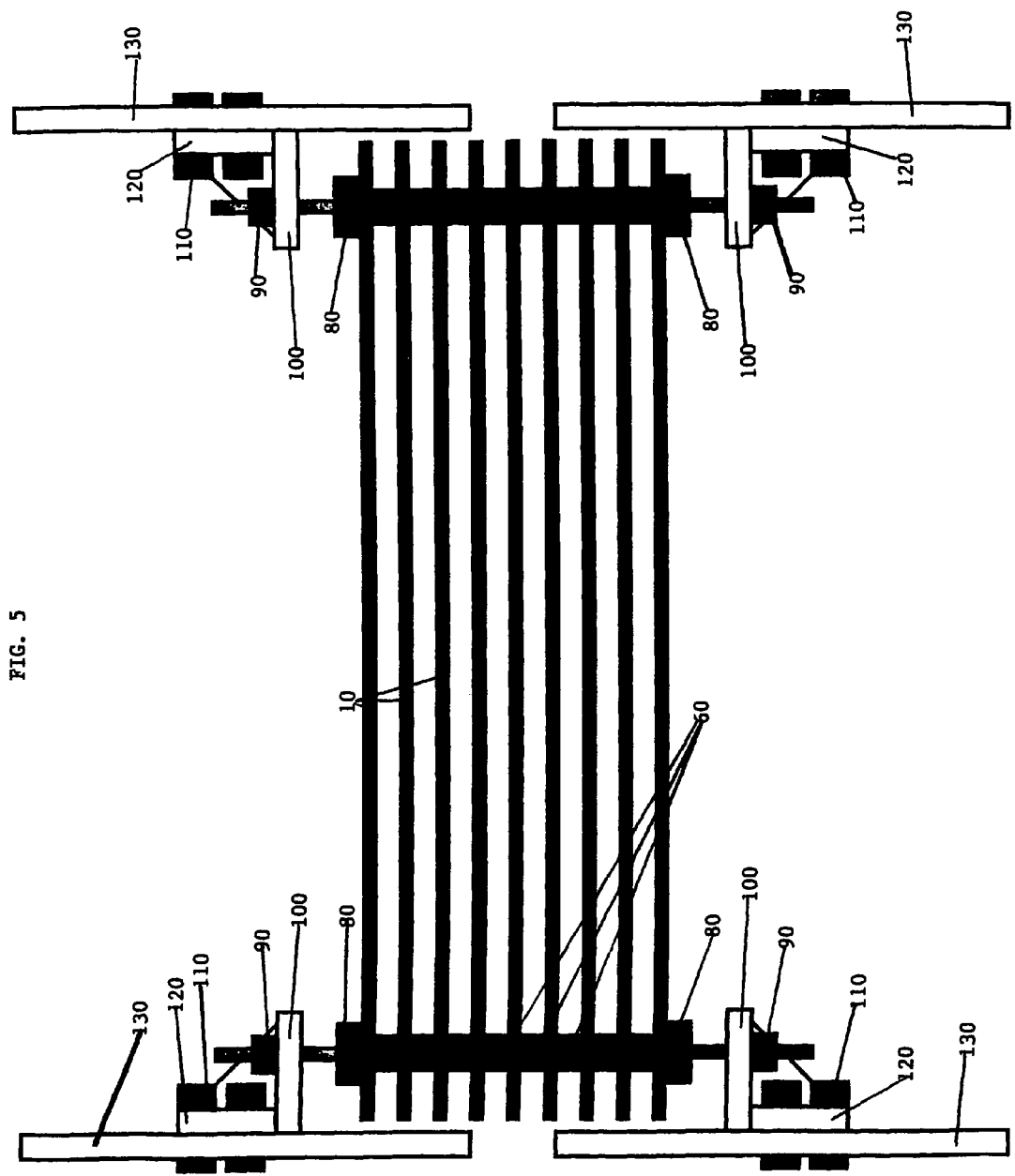

SYSTEM AND METHOD FOR CUTTING GRANITE OR SIMILAR MATERIALS

CROSS-REFERENCE TO RELATED APPLICATIONS

This application is a U.S. national phase of international application PCT/US2004/026316, filed on Aug. 13, 2004, which claims priority to, and incorporates by reference in its entirety, U.S. Provisional Patent Application No. 60/495,148, entitled "Method to Improve Tool Integrity When Cutting Stone," filed Aug. 14, 2003.

TECHNICAL FIELD

This application relates to frame saw systems and methods of manufacturing slabs. In particular, this application relates to a method and system for sawing a block of marble, granite, or similar rock by means of a multiple blade frame saw system.

BACKGROUND

Frames with multiple blades are commonly used for cutting or sawing blocks of a masonry material such as concrete, marble, granite, sandstone, limestone, fired brick or a like material, as well as for cutting blocks of composite material made of stone or marble chippings bound together by a binder material. Such frames may have steel blades or steel blades equipped with diamond-containing segments, with each of the blades being maintained under tension. Such tension may be supplied, for example, by one or more tension rods.

For example in U.S. Pat. No. 4,566,427, a device for cutting blocks of granite, marble, stone and similar materials is provided. Such a device includes a plurality of sawing blades; a blade-carrying frame into which at least two sawing blades are fixed and having slide means for directing horizontal motion of said frame; a drive motor unit connected to said blade-carrying frame for displacing said sawing blade in a reciprocating motion, a slide-carrying frame of generally rectangular cross-section, upright supports, a guide unit on each upright support connected to said slide-carrying frame for directing vertical movement of said slide-carrying frame, said slide means of said blade-carrying frame being adapted to fit within said slide-carrying frame, and vibration damping means for creating pressure on the top, bottom, and each side of said slide means to urge said slide means away from contact with said slide-carrying frame, thus providing a vibration dampened connection between said slide-carrying frame and said blade-carrying frame, whereby vibrations to the sawing blades is minimized.

In another example, in U.S. Pat. No. 5,233,968, a sawing machine including multiple blades in a stiff support framework is described to saw stone blocks, and particularly granite. The sawing machine uses rectilinear travel wherein, in correspondence of the abrasion zone and in addition to the conventional translatory motion, a blade frame is used with a hammering or percussion movement of the saw blades onto the stone block being cut. The machine is designed so that the blades may "jump", meaning that the blades may be lifted from the bottom of the cutting channels and then be dropped again therein in a short, rapid movement.

In another granite sawing operation employing horizontal frame saws, each frame saw has up to 250 steel blades each more than 3 meters long, 3-5 mm thick, and 50-200 mm tall. After sawing granite or marble blocks into slabs, the slabs are polished to ultimately generate finished components such as tiles and blocks. Slabs may be considered to be sufficiently flat if the surface deviates less than about 1.5 mm from a plane. Slabs of thickness variation of greater than about 2 mm cannot be sorted and polished, and often must be scrapped. In another example, a slab's thickness variation may be considered acceptable for polishing if the difference between the thickest and thinnest points in the slabs is less than about 10% of the slab's nominal thickness.

To meet finished granite/marble product quality control requirements such as those detailed above, the blades must not deviate from a substantially straight path as they cut through a block of marble or granite. Blade deviation can arise when local forces cause the blade to twist, flex, or bend out of a plane, leading to cuts deviating from a straight path and slabs exceeding the allowable thickness variation. Additionally, blade deflection causes premature blade wear due to blade flexing, buckling, and fracture.

One source of local forces causing blade flexing or deviation is the irregularities of the masonry material to be cut or sawed. Mined masonry materials typically have internal faults. Granite and marble materials, endowed with color and vein structure, are usually defective due to fracturing during geological formation. Some of the defects may be external, as caused by mining conditions with drill holes and other asperities. As saw blades are used to cut as-mined masonry materials, the blades can experience highly variable forces due to the irregularities in the materials which may cause premature wear in steel blades and deviation from a substantially parallel cut in the slab. As an additional problem in cutting or sawing masonry materials, superabrasive particles of the saw blades may be detached or pulled-out from superabrasive containing blades during operation. This pull-out of the superabrasive particles in the blades is heightened by the irregularities of the masonry material.

Because of the intrinsic defects in the raw masonry materials and the prior art cutting and sawing systems, the cutting of slabs from marble and other rock is costly due to the large amount of reject material and/or machine wear. There is a need for improved methods and systems for cutting slabs of masonry materials such as granite, marble, rock, and the like.

SUMMARY

An embodiment of the invention relates to a frame saw system, such as a horizontal system having multiple parallel, spaced-apart blades, for cutting a block of granite, marble, or like material. In this embodiment, the system includes a support structure of unifying material bonded to at least one of the blades for keeping the blades in fixed relative positions. In this embodiment, the support structure may form an integral cohesive mass and is removable from the frame saw system as the blades are engaged in a swinging motion cutting into the block. The support structure is removed and/or worn away as the blades engage the block. The support material is completely removed when the blades are fully submerged in the block.

In another embodiment, the invention relates to a frame saw system having multiple blades, wherein the individual blades are stabilized when cutting or otherwise manufacturing slabs of masonry materials such as granite, marble, rock, and the like. In this embodiment, the frame saw system may have one or more spacers located longitudinally in between individual saw blades for keeping the blades in fixed relative positions. Out-of-plane blade deflection in a frame saw comprising multiple blades may be minimized in such a system by imposing side forces on the blades, wherein the forces are applied to both sides of the frame saw and are directed perpendicularly to the individual blades.

In another embodiment, the frame saw systems are used in processes for cutting a block of granite, marble, or like material.

In another embodiment, the invention relates to a process for cutting a block of granite, marble, or like material, wherein the surface of the block is pretreated with a skim coat to substantially remove surface irregularities prior to cutting operations.

BRIEF DESCRIPTION OF THE DRAWINGS

FIG. 5 is a schematic top view of one frame saw embodiment of the present invention showing compressive side forces applied to blades mounted in a swing-type frame saw.

DETAILED DESCRIPTION

Before the present structures and methods are described, it is to be understood that this invention is not limited to the particular processes, systems, compositions, or methodologies described, as these may vary. It is also to be understood that the terminology used in the description is for the purpose of describing the particular versions or embodiments only, and is not intended to limit the scope of the present invention which will be limited only by the appended claims.

It must also be noted that as used herein and in the appended claims, the singular forms "a", "an", and "the" include plural reference unless the context clearly dictates otherwise. Thus, for example, reference to a "blade" is a reference to one or more blades and equivalents thereof known to those skilled in the art, and so forth. Unless defined otherwise, all technical and scientific terms used herein have the same meanings as commonly understood by one of ordinary skill in the art. Although any methods and materials similar or equivalent to those described herein can be used in the practice or testing of embodiments of the present invention, the preferred methods, devices, and materials are now described. All publications mentioned herein are incorporated by reference in their entirety. Nothing herein is to be construed as an admission that the invention is not entitled to antedate such disclosure by virtue of prior invention.

In the following description various embodiments of a frame saw system and methods of cutting granite, marble, and other stone and masonry materials are provided.

In one embodiment of the invention, a simple and effective process to stabilize frame saw blades in cutting masonry blocks includes providing one or more unifying support structures perpendicularly across the individual frame saw blades during cut initiation. In another embodiment, frame saw blade integrity may be maintained by applying a skim coat to the surface of the masonry block prior to cutting. In another embodiment, a frame saw system comprising multiple individual blades with spacers located in between is provided. In another embodiment, compressive or clamping forces are applied to a collection of adjacent blades mounted on a frame saw to increase their resistance to deflection under the forces created by sawing.

Figure 1A:
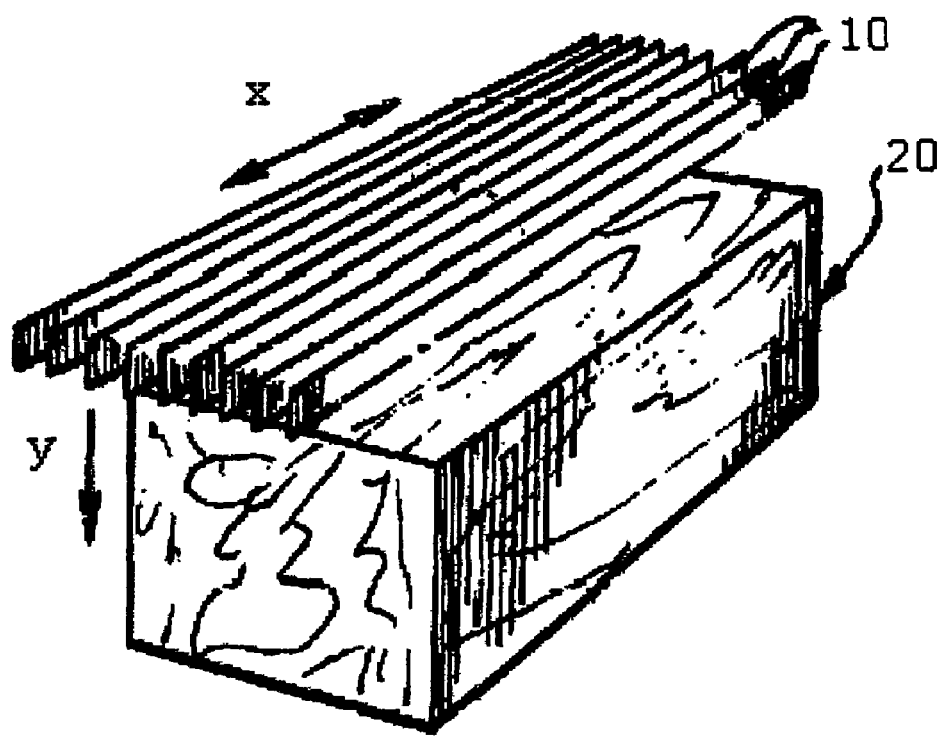
FIG. 1A is a perspective view of a block of granite, marble, or like stone which is about to undergo a sawing operation.

Sawing Operations with Frame Saw: FIG. 1A is a schematic drawing of a sawing operation, in which a representative masonry block 20 is cut into slabs. The block 20 can be marble, granite, or like hard rock, and the like, or a composite block made of chips or pieces of one or more stone materials bound together by a binder.

Figure 1B:
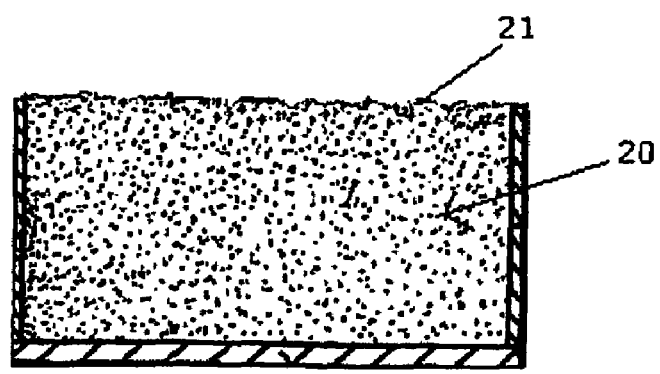
FIG. 1B is a cross sectional view of the block of granite, marble, or like stone of FIG. 1A, with surface irregularities.

FIG. 1B is a cross-section view of as-mined block 20, with the typical surface irregularities 21 including various high points, low points or drill holes.

In a sawing operation of one embodiment of the invention, block 20 is subject to sawing in its longitudinal direction by means of a multiple blade frame of the horizontal kind, having saw blades 10 extending horizontally as illustrated in FIG. 1A. In one embodiment, the blades comprise a cutting edge with superabrasive-containing segments mounted thereon to engage the block 20. Such superabrasive segments may include particles of diamond, cubic boron nitride or mixtures thereof. In another embodiment, the blades are made of steel and engage the block in connection with a slurry comprising steel shot and lime dispersed in water. The slurry may be poured over the frame saw system to aid in cutting, wherein the steel shot fills the space between the granite and the blades.

The blades 10 may be reciprocated along their length, as indicated by the double-headed arrow "x," in respective vertical cutting planes. The blades 10 may be moved in the direction of the arrow "y" within the cutting zone relative to the block 20 by a feed mechanism (not shown), preferably with the pitch or distance between the blades being approximately the thickness of the finished slabs, for example, about 2 cm. The cutting zone may be supplied with cooling water (not shown), which optionally may contain suspension siliceous sand, metal particles or other abrasive particles. In some operations, the cooling water may further include a surfactant to help increase the speed at which the blades penetrate the masonry materials, and it may reduce blade wear. The surfactants may be anionic or cationic materials such as alkyl benzyl sulfonate, alkyl sulfates derivatives of coconut oil and tallow, sodium dodecyl sulfate, alkyl ether sulfate, trimethyldodecyl ammonium chloride, a polyalkylene oxide, and the like, or they may be other materials.

Figure 2A:
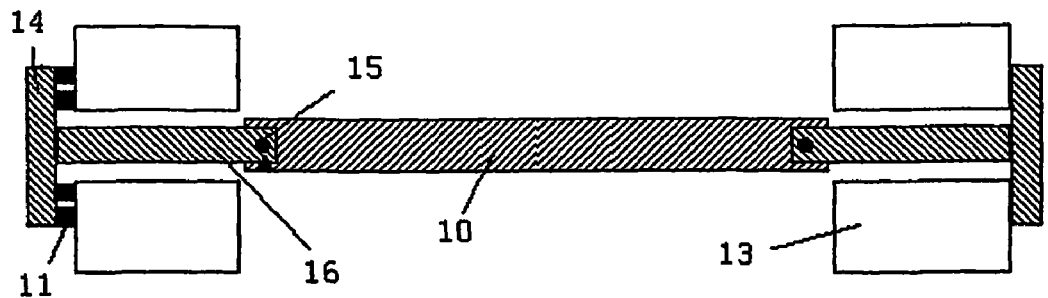
FIG. 2A is a side view of a horizontal saw frame system in the prior art.

FIG. 2A is a schematic side view of a blade as mounted in a frame saw as used in related art. As shown in the figure, tensioning rods 16 at opposite ends of the blade may be attached to the blade via loading pins 15, which may pass through holes in both the rod and the blade. Hydraulic pistons 11 built into one end of the frame 13 may create tension to keep blade 10 straight in operation.

Figure 2B:
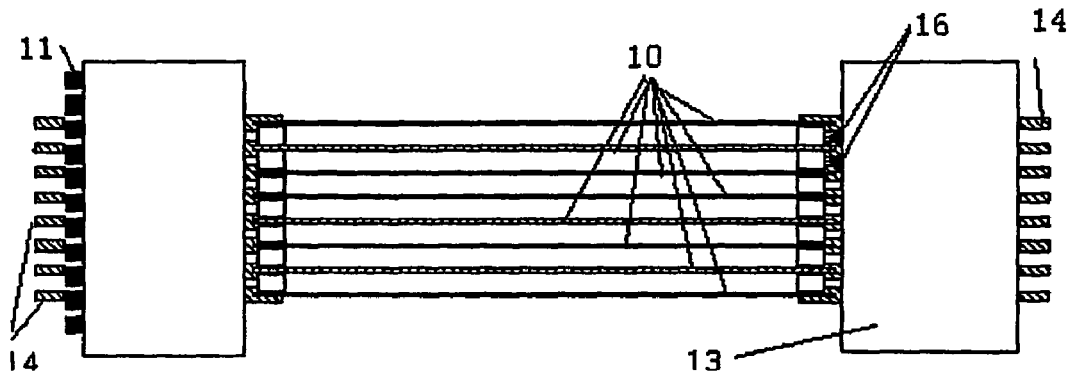
FIG. 2B is a top view of a horizontal saw frame system in the prior art.

FIG. 2B is a schematic top view of a conventional horizontal frame saw wherein a plurality of blades 10 are attached by tensioning rods 16 to a frame 13 to provide support to the blades. FIG. 2B shows a conventional horizontal frame saw where the middle section of blades 10 are without any unifying support system and are thus free to bow and twist under the forces of cutting.

Figure 2C:
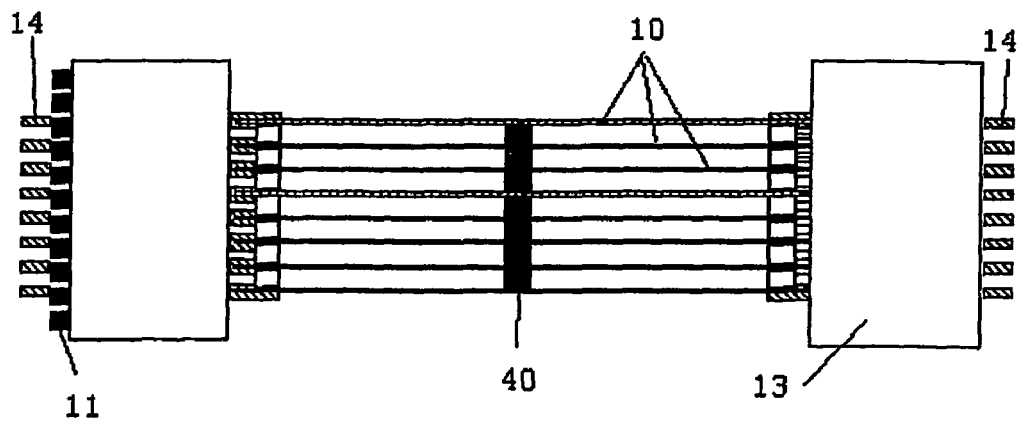
FIG. 2C is a top view of a horizontal saw frame system of one embodiment of the present invention.

Process to Stabilize Frame Saw Blades. In contrast to FIG. 2A and FIG. 2B, FIG. 2C is a schematic top view of a horizontal frame operation of one embodiment of the invention, wherein a unifying support system 40 is provided across the blades. The unifying support system of the frame saw depicted in FIG. 2C may be present at the initial stage of cutting the block, during which time the cut paths of the blades are being established as they engage the block 20 (not shown). Referring solely to the x, y, and z reference frame in FIG. 1A, the unifying support system may be applied to any known frame saw across the blades in the "z" direction. Preferably, the support system is applied in the "z" direction across the middle section of the blades. As used herein, the middle section refers to a location anywhere in the "middle" section of the blade in the "x direction", an area representing about half of the total blade length, which is defined by the points at about ¼ blade length from each of the two ends of the blade. One or more unifying support systems 40 may be provided perpendicularly across the blades. If one unifying support system 40 is provided, it is preferably provided perpendicularly across the blades at about the mid-point between the two ends of the blades. The unifying support system 40 configuration may vary.

If support 40 were a permanent fixture of the frame saw system, it would provide support to the blades and hold the blades in a fixed position. However, a permanent fixture across the "z direction" of the blades would not allow the blades to cut the block any deeper than a few inches. Such a permanent unifying support system would defeat the purpose of a cutting operation by preventing cutting. Applicants have found that a temporary support system that provides the blades with unifying support in the cut initiation step significantly reduces the propensity for frame saw blades to twist, vibrate or bow, but still allows the total thickness of the block to be cut by the blades. If one blade experiences sufficient force to cause it to deform, the support system that attaches the blade to adjacent blades will transfer the load of the force across the other blades, thus reducing the stress on any single blade. Once the blades are fully engaged within the thickness of the block, the support system is not needed anymore. The support system may not be permanently attached to the blades and may therefore be substantially removed or pulled away from the cutting surface as the frame saw becomes engaged in a block. In other embodiments, the support system is "removed" in that it substantially erodes or wears away from the blades as the support material contacts the block as the blades becomes engaged in the block. Therefore, a support system may be designed so that it provides initial unifying support but is substantially removed once the blades are engaged in the block so that the support does not interfere with the cutting operations.

Figure 3A:
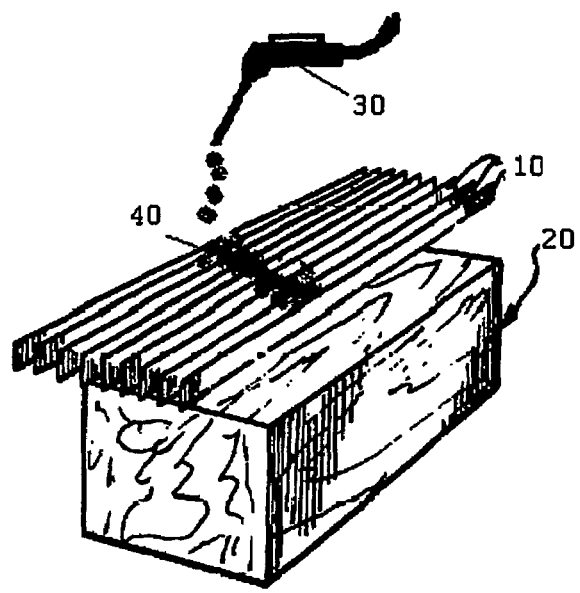
FIG. 3A is a partial perspective view of an operation of an embodiment of the present invention, wherein a block of granite, marble, or like stone is about to undergo a sawing operation.

One embodiment of supplying a unifying support system to a frame saw is depicted in FIG. 3A. A process of stabilizing the frame saw assembly with the temporary support 40 may include the steps of: (a) mixing polymeric components such as a blended polyol water soluble mixture with an isocyanate fluid to form an expandable polymeric foam mixture which is then injected under high pressure through the injection gun 30; and (b) dispersing the mixture from the gun across the plurality of blades in the "z" direction. Once dispersed, the mixture may expand into foam which fills between the blades, forming a unifying cohesive mass integral with the blade system. The foam may be a one-component system with a polymeric blend such as a polymeric/polyol, polyurethane prepolymer, polymeric hydrocarbon propellant to be delivered as a foam from a delivery device such as a tank or discharge nozzle. In another embodiment, the foam may include material such as polyurethane, polyethylene, e.g., Ethafoam® of Dow Chemical Company, polystyrene, and/or copolymers of the foregoing.

Polymeric foams are generally very adhesive by nature, and thus ensure adequate bonding to the blades to stabilize the blades in their place. They are also typically of sufficient density to remain in place between the blades as they are applied, producing a spongy, three dimensional, compressible, elastomeric substance, with open or closed cells or pores containing entrapped gas for energy absorption, providing a mechanism for dampening vibration in the frame saw system in the cut initiation step.

Figure 3B:
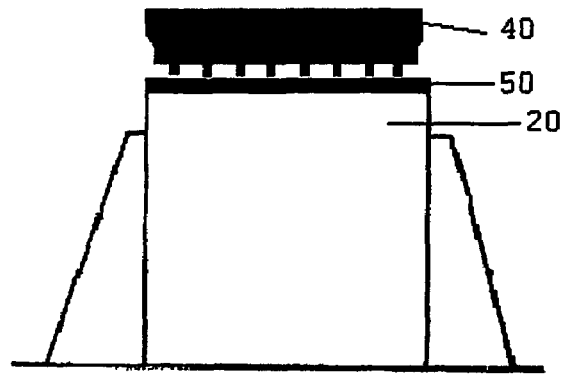
FIG. 3B is a cross sectional view of an embodiment of a sawing operation, wherein a block of granite, marble, or like stone is about to cut by the multiple blade system of the invention.

In another embodiment of the invention as illustrated in FIG. 3B, a unifying support system 40 is in the form of an interconnected system of "spacers," prefabricated for the frame saw system with each width of each spacer being sized to fit in-between the saw blades to hold them in place. Adhesive sprays are optionally put on the surface of the spacers and or the blades, thus providing bonding as a removable cohesive mass between the support spacers and the blades.

As the cutting progresses beyond the initiation step to establish a straight cut (with the blades 10 being held in place by stabilizing support 40), the stabilizing support system may be removed in operation by being pulverized away by the block as the blades go deeper into the block.

It should be noted that the several embodiments of the present invention are not limited to polymeric materials in that various non-polymeric materials capable of bonding to the blades for initial stabilization, and subsequently being worn or eroded away as blades 10 engage with the masonry block 20 in operation.

Illustrative non-foam materials, which may be polymers or non-polymers, suitable for use in the present invention may include cellulosic and polymer materials such as polyurethane, polyvinyl, latex, polyurethane, acrylate, cellophane and other polymers, and cellulosics or composites including but not limited to naturally found materials such as wood, mineral wools and cellulose products.

It should be further noted that the several embodiments of the present invention are not limited to the horizontal frame saw system as illustrated. The systems and processes the invention may be applied to any frame saw system known in the art wherein at least a pair of blades are used, including but not limited to the systems disclosed in U.S. Patent Application No. 2003/0127086 and U.S. Pat. Nos. 3,662,734; 4,566,427; and 5,233,965, each of which is incorporated herein by reference in its entirety.

Process to Further Stabilize Frame Saw System. In another embodiment of the invention to stabilize a frame saw system, in addition to or in lieu of providing a support system 40 to the frame saw operation, the frame sawing operation is further stabilized by removing or reducing the local forces that cause the blades to twist, flex, or that cause the diamond segments on the blades to be detached. In embodiments of the invention, the local forces may be minimized by simply replacing the surface irregularities inherent in the as-mined masonry blocks with a more uniform and regular surface for a blade to engage, thus reducing the peak forces on the blades.

Figure 3C:
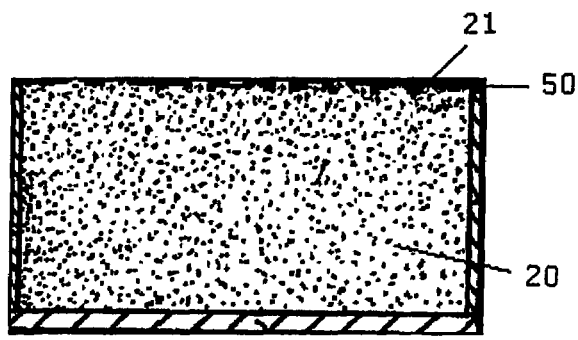
FIG. 3C is a cross sectional view of one embodiment of the present invention, wherein a block of granite, marble, or like stone containing surface irregularities is "treated" with a top skim coat.

As shown in FIG. 1B, the surface 21 of an as-mined block typically has irregularities such as various high points, low points and/or drill holes. Applicants have found that the application of a skim coat 50 in FIG. 3C onto the surface surprisingly reduces or minimizes the stress on steel blades in operation, allowing the blades to completely cut through a granite block without losing any, or substantially any, diamond segments. Without the application of the skim coat, as many as 30% of the segments may be detached from the blades while the cutting operation begins.

As used herein, "skim coat" 50 refers to a surface layer that adheres to the surface 21 of the masonry block 20, of sufficient consistency and smoothness to spread onto the surface of the block to level out the block surface. In one embodiment of the invention, the skim coat is a composition of about 1 part cement, e.g., Portland cement, to about 2 parts sand, for a substantially smooth surface. Other compositions are possible.

Figure 4:
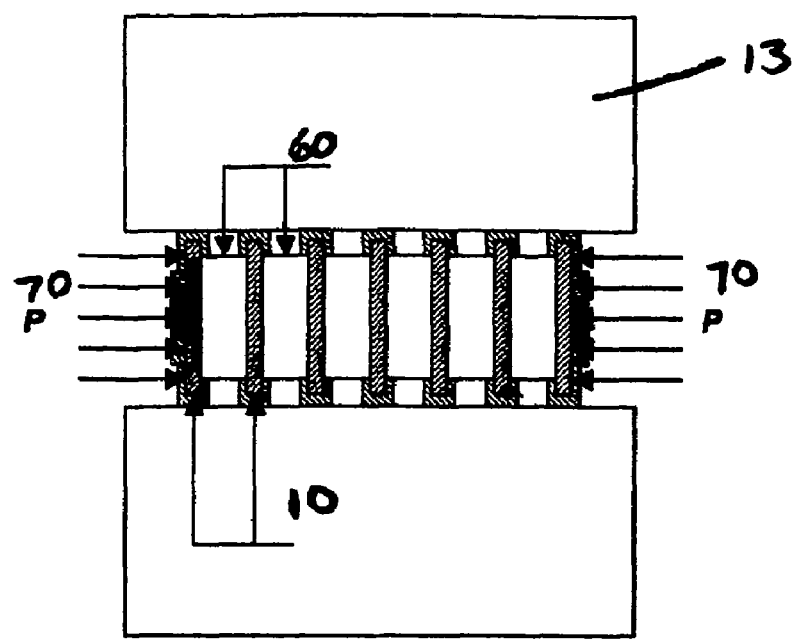
FIG. 4 is a schematic view of one frame saw embodiment of the present invention showing compressive side forces applied to blades mounted in a swing-type frame saw.

In another embodiment of the invention, a frame saw system comprises a number of generally parallel, spaced apart blades wherein the blades are mounted onto the frame under tension to minimize out-of-plane deflections by imposing side forces on the blades. A front view of a frame saw system with side forces applied to the blade is depicted in FIG. 4. This frame saw may be used in connection with a unifying support system and/or with a skim coat. Such a system may also be employed in a frame saw with steel blades used in connection with a slurry comprising steel shot and lime dispersed in water to engage the block. The slurry may be poured over the frame saw system to aid in cutting, wherein the steel shot fills the space between the granite and the blades.

Additionally, this saw system may be used with blades that have a cutting edge with diamond-containing segments mounted thereon to engage the block. Compressive or clamping forces are applied to a collection of adjacent blades mounted on a frame saw to increase their resistance to deflection under the forces created by sawing. Such clamping forces may be applied to the outer most blades in the frame saw and may be directed inwardly, toward each other, in the "z" direction. Any means by which compressive forces are applied to the blade set, as schematically illustrated in FIG. 4 are acceptable for improving control over blade deflection.

In FIG. 4, the frame 13 comprises multiple blades 10 with spacers 60 located longitudinally between the blades. The spacers are made of any suitable material and are shaped so that they will fit between the blades of the frame saw. The spacers may be placed between the individual blades for support and to minimize deflection. These spacers may be a polymeric material, such as a polyurethane foam. These may be designed to retract while cutting as described in reference to the unifying support system design. Forces 70 are applied perpendicularly and inwardly to the blades in order to minimize deflection.

An example of the frame saw system with compressive forces applied to a collection of adjacent blades is a steel framework mounted to the saw frame wherein the forces are applied across plates in contact with the outermost blades, as illustrated in FIG. 5. As seen in FIG. 4, the frame saw system in FIG. 5 comprises multiple blades 10 with spacers 60 located longitudinally between the blades. Compressive perpendicular forces may be applied by bolts 90 tightened against the plates 80 through adjustable vertical mounts 100. The vertical mounts 100 may be held using bolts 110 attached through horizontal guide ways 120 welded to the saw frame 130.

The use of a slurry to aid in cutting and engaging the granite or other material to be cut may be used in connection with any of the frame saw embodiments. The use of blades comprising superabrasive segments such as diamond segments may be used in connection with any of the frame saw embodiments. The diamond segments may be attached to the blades in any known manner. For example, the diamond segments may be sintered polycrystalline diamond particles brazed to the blades. In the several method embodiments, the cutting zone may be supplied with cooling water, which optionally may contain suspension siliceous sand, metal particles or other abrasive particles. In some operations, the cooling water may further include a surfactant to help increase the speed at which the blades penetrate the masonry materials, and it may reduce blade wear.

EXAMPLES

Examples are provided herein to illustrate the invention but are not intended to limit the scope of the invention.

Example 1

An as-mined block of Rosa Sardo granite is mounted in a swing-type multi-blade frame system. The blades are pieces of hot-rolled steel having a length of more than 3.0 m, width of more than 3 mm, and height between 50 and 200 mm. Each blade cutting edge has a plurality of diamond segments attached thereon by brazing.

After 3 hours of operation (and not cutting through the block), 30% of the diamond segments are torn off the blades.

Example 2

Example 1 is repeated with a similar size block of as-mined Rosa Sardo granite, with similar surface conditions. A mixture of mortar is prepared and applied onto the top of the block for a skim coating sufficient to smooth out the surface irregularities for a uniform, smooth, and regular surface. The block is then mounted in the multiple-blade frame system of Example 1 with a new set of blades having diamond segments mounted thereon.

The blades cut through the block without losing any segments.

Example 3

An as-mined block of Rosa Sardo granite is mounted in a swing-type multi-blade frame system. After mounting and tensioning the blade, expanding polymer foam ENERFOAM™ from Dow Chemical is sprayed between the blades. The foam attaches to the blades, expands as it cures, and hardens into a stiff matrix.

As the cutting proceeds, the foam is worn away/pulverized by the sawing process. The resulting slabs have surface deviations of less than 1 mm.

Example 4

Example 3 is repeated with no spraying of polyurethane foam for a support system.

The resulting slabs have surface deviations of between 1 and 1.5 mm.

While the invention has been described with reference to a preferred embodiment, those skilled in the art will understand that various changes may be made and equivalents may be substituted for elements thereof without departing from the scope of the invention. It is intended that the invention not be limited to the particular embodiment disclosed as the best mode for carrying out this invention, but that the invention will include all embodiments falling within the scope of the appended claims.

All citations referred herein are expressly incorporated herein by reference.

The many features and advantages of the invention are apparent from the detailed specification. Thus, the appended claims are intended to cover all such features and advantages of the invention which fall within the true spirits and scope of the invention. Further, since numerous modifications and variations will readily occur to those skilled in the art, it is not desired to limit the invention to the exact construction and operation illustrated and described herein. Accordingly, all appropriate modifications and equivalents may be included within the scope of the invention.

We claim:

1. A frame saw system for cutting a block of granite, marble or masonry material, comprising:
    a plurality of spaced apart, substantially parallel blades connected to a frame; and
    at least one fluidic support structure of unifying material supplied perpendicularly across the blades and adhering to at least one of the blades for keeping the blades in fixed relative positions:
    the fluidic support structure curing to form a cohesive mass bonding to at least one of the blades: and
    wherein the support structure is capable of being removed or pulled away from the frame saw system as the blades are engaged in cutting.

2. The frame saw system of claim 1, wherein the support structure forms an integral cohesive mass with the saw blades.

3. The frame saw system of claim 1, wherein the support structure comprises a polymeric foam.

4. The frame saw system of claim 3, wherein the polymeric foam includes a material selected from the group consisting of a polyurethane, a polyethylene, and a polystyrene.

5. The frame saw system of claim 1, wherein the blades are connected on both ends to the frame by tensioning rods.

6. The frame saw system of claim 1, further comprising clamps which contact the two outermost blades of the parallel blades in the frame saw.

7. The frame saw system of claim 6, wherein the clamps comprise a plate, bolts tightened against the plate, and adjustable vertical mounts.

8. The frame saw system of claim 1, wherein the blades comprise superabrasive containing segments.

9. The frame saw system of claim 1, wherein the support structure comprises a polymeric or non-polymeric non-foam material selected from the group consisting of a polyurethane, a latex, a polyvinyl, an acrylate, a cellophane, and a cellulosic material.

10. A frame saw system for cutting a block of granite, marble, or masonry material, comprising:
    a plurality of spaced apart, substantially parallel blades connected to a frame; and
    at least one fluidic support structure of unifying material supplied perpendicularly across the blades and adhering to at least one of the blades for keeping the blades in fixed relative positions, wherein the support structure comprises a polymeric foam which is cured to form a cohesive mass bonding to at least one of the blades; and
    wherein the support structure is capable of being removed or pulled away from the frame saw system as the blades are engaged in cutting.

11. The frame saw system of claim 10, wherein the polymeric foam includes a material selected from the group consisting of a polyurethane, a polyethylene, and a polystyrene.

12. The frame saw of claim 10, wherein the support structure is applied in a fluidic form and cures to form a cohesive mass bonding to at least one of the blades.

* * * * *